US006818726B2

(12) United States Patent
Rätzsch et al.

(10) Patent No.: US 6,818,726 B2
(45) Date of Patent: Nov. 16, 2004

(54) POLYMERS FROM HYDROXYALKYL AMINO TRIAZINES AND POLYFUNCTIONAL COMPOUNDS

(75) Inventors: Manfred Rätzsch, Wilhering (AT); Martin Burger, Linz (AT); Manfred Arnold, Leissling (DE); Willy Frank, Bad Lauchstädt (DE)

(73) Assignee: Agrolinz Melamin GmbH, Linz (AT)

( * ) Notice: Subject to any disclaimer, the term of this patent is extended or adjusted under 35 U.S.C. 154(b) by 185 days.

(21) Appl. No.: 10/205,006

(22) Filed: Jul. 25, 2002

(65) Prior Publication Data

US 2003/0045667 A1 Mar. 6, 2003

(30) Foreign Application Priority Data

Jul. 26, 2001 (DE) .......................... 101 36 321

(51) Int. Cl.[7] .................. C07D 251/42; C07D 251/48; C07D 251/70
(52) U.S. Cl. .................. 528/85; 528/118; 528/185; 528/186; 528/188; 528/219; 528/254; 528/256; 528/289; 544/194; 544/196; 544/197; 544/204; 544/205; 544/206
(58) Field of Search .......................... 528/85, 118, 185, 528/186, 188, 219, 254, 256, 289; 544/194, 196, 197, 204, 205, 206

(56) References Cited

U.S. PATENT DOCUMENTS

| 3,328,321 A | * 6/1967 | Wismer et al. ............. 521/131 |
| 3,399,151 A | 8/1968 | Kaiser |
| 3,812,122 A | 5/1974 | Lengsfeld |
| 4,356,304 A | * 10/1982 | Szita et al. ................. 544/196 |
| 4,369,258 A | 1/1983 | Johnson ..................... 521/107 |
| 5,153,245 A | * 10/1992 | Cipolli et al. .............. 524/100 |

FOREIGN PATENT DOCUMENTS

| DE | 2 118 868 A | 4/1971 |
| DE | 3512446 A | * 10/1986 |
| JP | 2001019682 A | * 1/2001 |

OTHER PUBLICATIONS

Kaiser et al., "Cyanuric acid derivatives. II. Substituted melamines," Chemical abstracts accession no. 1952:5579, Journal of the American Chemical Society (1951), vol. 73, abstract.*
Hackh's Chemical Dictionary, Fourth Edition, McGraw–Hill Book Company, New York, New York, 1969, p. 341, definition of "imino".*
Diem, Hans et al., "Amino Resins", *Ullmanns Encyclopedia of Industrial Chemistry*, 1977, pp. 130–131, vol. A2.

* cited by examiner

Primary Examiner—Robert Sellers
(74) Attorney, Agent, or Firm—Webb Ziesenheim Logsdon Orkin & Hanson, P.C.

(57) ABSTRACT

Polymers are prepared from
A) 60 to 95 percent by weight of a mixture including
  A1) 20 to 70 percent by weight of hydroxyalkyl amino triazines and
  A2) 30 to 80 percent by weight of bis(hydroxyalkyl) amino triazines
B) 5 to 40 percent by weight of polyfunctional compounds selected from one or more of
  B1) polyisocyanates and/or oligomeric polyesters or polyethers with isocyanate end groups,
  B2) aliphatic dicarboxylic acids, esters, chlorides or anhydrides, or aromatic polybasic acids, esters, chlorides or anhydrides,
  B3) aliphatic or aromatic diglycidal compounds or triglycidyl compounds, and, optionally,
C) 1 to 20 percent by weight of aliphatic, cycloaliphatic or aromatic dihydroxy compounds, polyalkylene glycols and aliphatic aldehydes.

7 Claims, No Drawings

POLYMERS FROM HYDROXYALKYL AMINO TRIAZINES AND POLYFUNCTIONAL COMPOUNDS

BACKGROUND OF THE INVENTION

Field Of The Invention

This invention relates to polymers made from triazine derivatives for producing intermediates and molded materials characterized by improved toughness, high flame resistance and strength, and to methods of their production.

Polymers made from triazine derivatives such as melamine formaldehyde resins [Ullmanns Encyclopedia of Industrial Chemistry (1997), Vol. A2, pp. 130–131], benzoguanamine formaldehyde resins [Duroplaste, Kunststoff-Handbuch Bd. 10, pp. 994–997, Carl Hanser-Verlag München 1999], polytriazine ethers or polyamino triazine [Bjuller, K., Teplo-i Termostoikie Polimery, pp. 585—585, Moskva, Khimia 1984] are known. A disadvantage of polymers from triazine derivatives is the low toughness of intermediates and molded materials produced from them.

Also known are melamine propylene oxide block copolymers (DE 21 18 888) and block copolymers from N.N'-hydroxyethyl melamines or N.N'-hydroxyaryl melamines with ethylene oxide and propylene oxide (U.S. Pat. No. 4,358,304). These block copolymers share the disadvantage that products made from them, despite their good toughness, will result in intermediates and molded materials of reduced flame resistance and strength due the length of the polyalkylene oxide sequences in the block copolymer and the occurrence of unbound polyalkylene oxide as a byproduct during production.

SUMMARY OF THE INVENTION

It is the problem of this invention to provide polymers made from triazine derivatives for producing intermediates and molded materials characterized by improved toughness, high flame resistance and strength, as well as methods of their production.

This problem is solved according to the invention based on

A) 80 to 95 percent by weight of triazine derivative mixtures consisting of

A1) 20 to 70 percent by weight of triazine derivatives with hydroxyalkyl amino groups of the formula

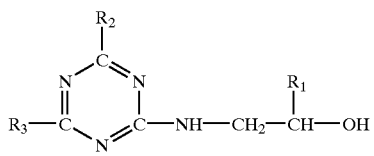

$R_1$=H or $C_1$–$C_4$alkyl $R_2$=—H; —OH; $C_1$–$C_4$ alkyl, —$C_6H_5$; —$NH_2$; —NH—$CH_2$—$CHR_1$—OH; —NH—$CH_2$—$OR_1$, or —N(—$CH_2$—$OR_1$)$_2$, $R_3$=—H; —OH; $C_1$–$C_4$ alkyl, —$C_6H_5$; —$NH_2$; —NH—$CH_2$—$CHR_1$—OH; —NH—$CH_2$—$OR_1$, or —N(—$CH_2$—$OR_1$)$_2$, wherein the number of hydroxyalkyl amino groups is 1 to 3, and A2) 80 to 30 percent by weight of triazine derivatives with bis(hydroxyalkyl)amino groups of the formula

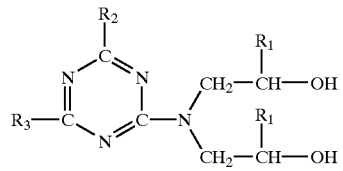

$R_1$=H or $C_1$–$C_4$alkyl $R_2$=—H; —OH; $C_1$–$C_4$ alkyl, —$C_6H_5$; —$NH_2$; —NH—$CH_2$—$CHR_1$—OH, —N[$CH_2$—$CHR_1$—OH]$_2$, —NH—$CH_2$—$OR_1$, or —N(—$CH_2$—$OR_1$)$_2$, $R_3$=—H; —OH; $C_1$–$C_4$ alkyl, —$C_6H_5$; —$NH_2$; —NH—$CH_2$—$CHR_1$—OH, —N[$CH_2$—$CHR_1$—OH]$_2$, —NH—$CH_2$—$OR_1$, or —N(—$CH_2$—$OR_1$)$_2$, wherein the number of hydroxyalkyl groups is 2 to 6, B) 5 to 40 percent by weight of polyfunctional consisting of B1) polyisocyanates of the formula R (N=C=O)$_x$, where R=$C_4$–$C_{18}$ alkyl, $C_5$–$C_8$ cycloalkyl and/or $C_6$–$C_{15}$ aryl, and x=2; 3; 4, and/or oligomeric polyesters or polyethers with isocyanate end groups and a molar weight in the range from 200 to 5000, B2) aliphatic $C_2$–$C_{36}$ dicarboxylic acids, dicarboxylic esters or dicarboxylic acid chlorides, aliphatic $C_4$–$C_6$ dicarboxylic acid anhydrides and/or aromatic polybasic $C_8$–$C_{23}$ carboxylic acids, carboxylic esters, carboxylic acid chlorides or carboxylic acid anhydrides, B3) aliphatic $C_8$–$C_{25}$ or aromatic $C_{12}$–$C_{28}$ di- and/or triglycidyl compounds, and, optionally, of C) 1 to 20 percent by weight of other functional compounds consisting of C1) $C_2$–$C_{18}$ aliphatic, $C_5$–$C_8$ cycloaliphatic and/or $C_6$–$C_{15}$ aromatic dihydroxy compounds, and/or C2) polyalkylene glycols with a molar weight in the range from 200 to 8000, and/or C3) $C_1$–$C_8$ aliphatic aldehydes.

Preferred are polymers from triazine derivative prepolymers with a number average molar weight in the range from 200 to 8000, cross-linked thermosetting or thermoplastic polymers with number average molar weights in the range from $8 \times 10^3$ to $10^7$.

DETAILED DESCRIPTION OF THE PREFERRED EMBODIMENTS

The triazine derivative mixtures A) that form the basis for the polymers made of triazine derivatives preferably contain A1) triazine replaced by hydroxyalkyl amino groups at a triazine/hydroxyalkyl amino group molar ratio from 1:1 to 1:2.5, and/or A2) triazine replaced by bis(hydroxyalkyl) amino groups and hydroxyalkyl amino groups at a triazine/hydroxyalkyl group molar ratio from 1:2.5 to 1:5.5.

Suitable other triazine derivatives that can form the basis of polymers from triazine derivatives include melamines replaced by amino $C_1$–$C_{12}$ alkyl groups, diaminomethyl triazines such as 2,4-di(6-aminohexylamino)-1,3,5-triazine, or diaminophenyl triazines, etherified methylol melamines, ammeline, ammelide, melem, melon, melam, benzoguanamine, acetoguanamine, methoxymethyl benzoguanamine, caprinoguanamine, and/or butyroguanamine replaced by hydroxy alkyl groups.

In addition to the triazine derivatives, the basis for polymers from triazine derivatives is formed by polyfunctional compounds consisting of B1) polyisocyanates of the formula R (N=C=O)$_x$, where R=C$_4$–C$_{18}$ alkyl, C$_5$–C$_8$ cycloalkyl, and/or C$_6$–C$_{15}$ aryl and x=2; 3; 4, and/or oligomeric polyesters or polyethers with isocyanate end groups having a molar weight in the range from 200 to 5000, or B2) aliphatic C$_2$–C$_{36}$ dicarboxylic acids, dicarboxylic esters or dicaraboxylic acid chlorides, aliphatic C$_4$–C$_6$ dicarboxylic acid anhydrides and/or aromatic polybasic C$_8$–C$_{23}$ carboxylic acids, carboxylic esters, carboxylic acid chlorides or carboxylic acid anhydrides, B3) aliphatic C$_8$–C$_{25}$ or aromatic C$_{12}$–C$_{28}$ di- and/or triglycidyl compounds, or Preferred as polyisocyanates B1) are tetramethylene diisocyanate, hexamethylene diisocyanate, toluylene diisocyanate, and/or diphenyl methane diisocyanate.

Examples of other isocyanates B1) suitable as a basis for the polymers from triazine derivatives are pentamethylene diisocyanate, phenylene diisocyanate, naphthylene diisocyanate, triphenyl methane triisocyanate and vinylphenyl diisocyanate as well as polyethylene glycols or polypropylene glycols with isocyanate end groups.

Examples of aliphatic C$_2$–C$_{36}$ dicarboxylic acids suitable as component B2) for the polymers from triazine derivatives are oxalic acid, succinic acid, adipic acid, tetradecanoic dicarboxylic acid, maleic acid, and C$_{24}$–C$_{36}$ dimer acids.

Examples of aliphatic C$_2$–C$_{36}$ dicarboxylic esters suitable as component B2) for the polymers from triazine derivatives are adipic diethyl ester tetradecanoic dicarboxylic diethyl ester, and maleic acid diethyl ester.

Preferred dicarboxylic acid anhydrides B2) as bifunctional compounds B) are succinic acid anhydride, maleic acid anhydride, glutaric acid anhydride, phthalic acid anhydride and/or norbornene dicarboxylic acid anhydride.

Other suitable dicarboxylic acid anhydrides include allyl succinic anhydride, bicyclooctene dicarboxylic acid anhydride, methoxycarbonyl maleic acid anhydride, citraconic anhydride, cyclohexene dicarboxylic acid anhydride, dodecencyl succinic anhydride, itaconic acid anhydride, and pyromellitic anhydride.

Examples of suitable aromatic polybasic C$_8$–C$_{23}$ carboxylic acids as component B2) for the polymers made from triazine derivatives are phthalic acid, terephthalic acid, trimellitic acid, and pyromellitic acid.

Examples of suitable aromatic polybasic C$_8$–C$_{23}$ carboxylic esters as component B2) for the polymers made from triazine derivatives are phthalic diethyl ester, terephthalic diethyl ester, and trimellitic diethyl ester.

Examples of suitable aliphatic C$_8$–C$_{25}$ or aromatic C$_{12}$–C$_{28}$ di- and/or triglycidyl compounds as component B3) for the polymers made of triazine derivatives are ethyleneglycol diglycidyl ether, glycerol triglycidyl ether, octanediol diglycidyl ether, hydroquinone diglycidyl ether, and diphenylol propane diglycidyl ether.

The basis for polymers can also be formed by other compounds consisting of

C1) C$_2$–C$_{18}$ aliphatic, C$_5$–C$_8$ cycloaliphatic and/or C$_6$–C$_{15}$ aromatic dihydroxy compounds, and/or C2) polyalkylene glycols with a molar weight in the range from 200 to 6000, and/or C3) C$_1$–C$_8$ aliphatic aldehydes.

Examples of C$_2$–C$_{18}$ aliphatic dihydroxy compounds suitable as component C1) are ethylene glycol, ethylhexane diol, and octadecane diol.

Examples of C$_5$–C$_8$ cycloaliphatic dihydroxy compounds suitable as component C1) are dihydroxycyclopentane, dihydroxycyclohexane, and dihydroxyethyl cyclohexane.

Examples of C$_6$–C$_{15}$ aromatic dihydroxy compounds suitable as component C1) are hydroquinone, diphenylol propane, and dihydroxydiphenyl oxide.

Examples of polyalkylene glycols with molar weights in the range from 200 to 6000 suitable as component C2) for the polymers made from triazine derivatives are polyethylene glycol and polypropylene glycol.

Examples of C$_1$–C$_6$ aliphatic aldehydes suitable as component C2) for the polymers made from triazine derivatives are formaldehyde, acetaldehyde, trimethylol acetaldehyde, acrylaldehyde, furfuryl aldehyde, and glyoxal.

The polymers made from triazine derivatives for intermediates and molded materials characterized by high flame resistance and strength can be produced in continuous kneaders in accordance with the melting process or in a liquid phase in accordance with a stirred tank reactor process.

In the melting process for producing polymers from triazine derivatives for intermediates and molded materials with improved toughness, high flame resistance and strength, mixtures are filled into continuous kneaders that are made of A) 60 to 95 percent by weight of triazine derivative mixtures consisting of A1) 20 to 70 percent by weight of triazine derivatives with hydroxyalkyl amino groups of the formula

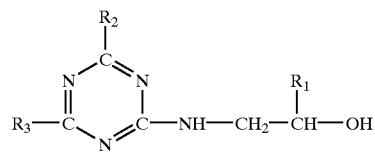

R$_1$=H or C$_1$–C$_4$ alkyl,

R$_2$=—H; —OH; C$_1$–C$_4$ alkyl, —C$_6$H$_5$; —NH$_2$; —NH—CH$_2$—CHR$_1$—OH; —NH—CH$_2$—OR$_1$, or —N(—CH$_2$—OR$_1$)$_2$, R$_3$=—H; —OH; C$_1$–C$_4$ alkyl, —C$_6$H$_5$; —NH$_2$; —NH—CH$_2$—CHR$_1$—OH; —NH—CH$_2$—OR$_1$, or —N(—CH$_2$—OR$_1$)$_2$, wherein the number of hydroxyalkyl amino groups is 1 to 3, and A2) 60 to 30 percent by weight of triazine derivatives with bis(hydroxyalkyl) amino groups of the formula

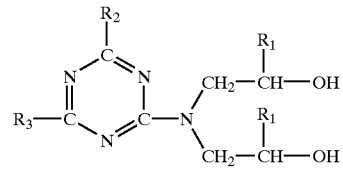

R$_1$=H or C$_1$–C$_4$ alkyl

R$_2$=—H; —OH; C$_1$–C$_4$ alkyl, —C$_6$H$_5$; —NH$_2$; —NH—CH$_2$—CHR$_1$—OH, —N[CH$_2$—CHR$_1$—OH]$_2$, —NH—CH$_2$—OR$_1$, or —N(—CH$_2$—OR$_1$)$_2$, R$_3$=—H; —OH; C$_1$–C$_4$ alkyl, —C$_6$H$_5$; —NH$_2$, —NH—CH$_2$—CHR$_1$—OH, —N[CH$_2$—CHR$_1$—OH]$_2$, —NH—CH$_2$—OR$_1$, or —N(—CH$_2$—OR$_1$)$_2$, wherein the number of hydroxyalkyl groups is 2 to 6, B) 5 to 40 percent by weight of polyfunctional compounds consisting of B1) polyisocyanates of the formula R (N═C═O)x, where R═$C_4$–$C_{18}$ alkyl, $C_5$–$C_8$ cycloalkyl, and/or $C_6$–$C_{15}$ aryl, and x=2; 3; or 4, and/or oligomenc polyesters or polyethers with isocyanate end groups and a molar weight in the range from 200 to 5000, or B2) aliphatic $C_2$–$C_{36}$ dicarboxylic acids, dicarboxylic esters or dicarboxylic acid chlorides, aliphatic $C_4$–$C_6$ dicarboxylic acid anhydrides and/or aromatic polybasic $C_8$–$C_{23}$ carboxylic acids, carboxylic esters, carboxylic acid chlorides or carboxylic acid anhydrides, or B3) aliphatic $C_8$–$C_{25}$ aromatic $C_{12}$–$C_{28}$ di and/or triglycidyl compounds, and, optionally, of C) 1 to 20 percent by weight of one or more other functional compounds consisting of C1) $C_2$–$C_{18}$ aliphatic, $C_5$–$C_8$ cycloaliphatic and/or $C_6$–$C_{15}$ aromatic dihydroxy compounds, and/or C2) polyalkylene glycols with a molar weight in the range from 200 to 8000, and/or C3) $C_1$–$C_8$ aliphatic aldehydes, dissolved by heat at temperatures of 160 to 280° C., reacted for a dwell time of 5 to 20 minutes, vacuum degassed, removed and granulated, or, removed by a mold while optionally adding acidic catalysts and molded into a profile, pipe, or plate, wherein the bifunctional compounds B) and the other functional compounds C) are premixed with the A) mixtures before filling the mixture into the continuous kneader, or, alternatively, wherein the bifunctional compounds B) and the other functional compounds C) are filled into the continuous kneader after the mixtures A) are dissolved by heat into melt A).

The preferred types of continuous kneaders used are twin-screw extruders with an L/D ratio of 32 to 48 or single-screw extruders with a plunger-type screw.

For producing triazine prepolymers with number average molar weights in the range from 200 to 8000, melt temperatures of 160 to 220° C. and a triazine derivative A)/polyfunctional compounds B) or triazine derivatives A)+other functional compounds C)/polyfunctional compounds B) ratio of 1.05 to 1.30 are required. This production method is particularly suited for molding compounds, and the desired dosage of these molding compounds (homogenization with fillers and/or reinforcing agents and hardeners) can either be performed in a subsequent process step or by adding the ingredients to and homogenizing them in, the continuous kneader before the product is removed.

The production of thermoplastic polymers with number average molar weights in the range from $8 \times 10^3$ to $10^7$ from triazine derivatives requires melt temperatures of 220 to 280° C. The products used as triazine derivatives have an average number of hydroxyalkyl replacements of 0.96 to 1.04. The molar ratio of triazine derivatives A)/bifunctional compounds B) or triazine derivatives A)+other functional compounds C)/bifunctional compounds B) should be set between 0.98 and 1.02 in the melt process, and the products should be thoroughly vacuum degassed.

For the immediate production of cross-linked thermosetting profiles, pipes, or plates from triazine polymers, the mixture is heated like in the prepolymer production process to melt temperatures of 160 to 220° C., and the initial molar ratio of triazine derivatives A)/polyfunctional compounds B) or triazine derivatives A)+other functional compounds C)/polyfunctional compounds B) is set between 1.05 and 1.30. In addition to the dosage described, other portions of polyfunctional compounds B) are filled into a downstream reaction zone in the continuous kneader but upstream of the mold, so that a molar ratio of triazine derivatives A)/polyfunctional compounds B) or triazine derivatives A)+other functional compounds C)/polyfunctional compounds B) of 0.75 to 0.95 is set in the reaction zone upstream of the mold.

A second variant of producing cross-linked thermosetting profiles, pipes and plates directly from triazine polymers is characterized in that aliphatic aldehydes are used as other functional compounds C) when the prepolymers are produced and a molar ratio of triazine derivatives A)/polyfunctional compounds B)/aliphatic aldehydes C) between 1:1:1 and 1:1:3 is set and in that acidic catalysts such as ammonium peroxodisulfate, ammonium phosphate, ammonium sulfate, methylammonium phthalate, or diethyl phosphate are added to the downstream reaction zone in the continuous kneader and upstream of the mold.

In the stirred tank reactor process for producing polymers from triazine derivatives for intermediates and molded materials with improved toughness and high flame resistance and strength, according to the invention, dispersions in $C_5$–$C_{12}$ hydrocarbons and/or $C_3$–$C_{12}$ ketones or solutions in dimethyl sulfoxide, dimethyl formamide and/or dimethyl accetamide with a solids content of 5 to 70 percent by weight consisting of 60 to 95 percent by weight of triazine derivative mixtures consisting of A1) 20 to 70 percent by weight of triazine derivatives with hydroxyalkyl amino groups of the formula

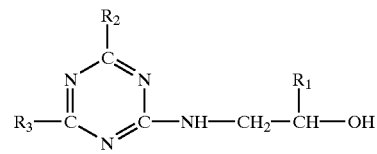

$R_1$=H or $C_1$–$C_4$ alkyl $R_2$=—H; —OH; $C_1$–$C_4$ alkyl, —$C_6H_5$; —$NH_2$; —NH—$CH_2$—$CHR_1$—OH; —NH—$CH_2$—$OR_1$, or —N(—$CH_2$—$OR_1$)$_2$, $R_3$=—H; —OH; $C_1$–$C_4$ alkyl, —$C_6H_5$; —$NH_2$; —NR—$CH_2$—$CHR_1$—OH; —NH—$CH_2$—$OR_1$, or —N(—$CH_2$—$OR_1$)$_2$, wherein the number of hydroxyalkyl amino groups is 1 to 3, and A2) 80 to 30 percent by weight of triazine derivatives with bis(hydroxyalkyl) amino groups of the formula

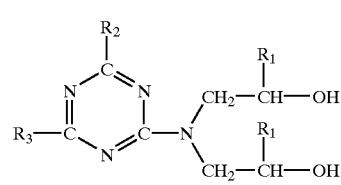

$R_1$=H or $C_1$–$C_4$ alkyl, $R_2$=—H; —OH; $C_1$–$C_4$ alkyl, —$C_6H_5$; —$NH_2$; —NH—$CH_2$—$CHR_1$—OH, —N[$CH_2$—$CHR_1$—OH]$_2$, —NH—$CH_2$—$OR_1$, or —N(—$CH_2$—$OR_1$)$_2$, $R_3$=—H; —OH; $C_1$–$C_4$ alkyl, —$C_6H_5$; —$NH_2$; —NH—$CH_2$—$CHR_1$—OH, —N[$CH_2$—$CHR_1$—OH]$_2$, —NH—$CH_2$—$OR_1$, or —N(—$CH_2$—$OR_1$)$_2$, wherein the number of hydroxyallcyl groups is 2 to 6, B) 5 to 40 percent by weight of polyfunctional compounds consisting of
B1) polyisocyanates of the formula R (N=C=O)x, where R=$C_4$–$C_{18}$ alkyl, $C_5$–$C_8$ cycloalcyl and/or $C_6$–$C_{15}$ aryl and x=2; 3; 4, and/or oligomeric polyesters or polyethers with isocyanate end groups and a molar weight in the range from 200 to 5000, or
B2) aliphatic $C_2$–$C_{36}$ dicarboxylic acids, dicarboxylic esters or dicarboxylic acid chlorides, aliphatic $C_4$–$C_6$ dicarboxylic acid anhydrides; and/or aromatic polybasic $C_8$–$C_{23}$ carboxylic acids, carboxylic esters, carboxylic acid chlorides or carboxylic acid anhydrides, or
B3) aliphatic $C_8$–$C_{25}$ or aromatic $C_{12}$–$C_{28}$ di-and/or triglycidyl compounds, and, optionally, of
C) 1 to 20 percent by weight of one or more other functional compounds consisting of
C1) $C_2$–$C_{18}$ aliphatic, $C_5$–$C_8$ cycloaliphatic, $C_6$–$C_{15}$ aromatic dihydroxy compounds, and/or
C2) polyalkylene glycols with a molar weight in the range from 200 to 8000, and/or
C3) $C_1$–$C_8$ aliphatic aldehydes, are homogenized and reacted in stirred tanks with bottom outlets, optional azeotrope separators and condensers at temperatures of 50 to 150° C., pressures of 1 to 15 bar and dwell times of 40 minutes to 12 hours, and, after an optional reduction by distillation, the polymeric reaction products are removed and dried by spray drying or after filtering; the reaction may optionally be continued in a second reaction step after dissolving the products by heat in a continuous kneader at temperatures in the range from 180 to 280° C., then the reaction products are degassed, removed and granulated. Depending on the reaction temperature and the reactivity of the reactants, the bifunctional compounds B) and the other functional compounds C) are added to the mixtures A) in the stirred tank reactor either at once, in portions, or continuously.

Suitable $C_5$–$C_{12}$ hydrocarbons that can be used in the stirred tank reactor process for producing polymers from triazine derivatives are aliphatic hydrocarbons such as pentane, heptane or dodecane, cycloaliphatic hydrocarbons such as cyclopentane or cyclohexane or aromatic hydrocarbons such as benzene, toluene, or xylene.

Suitable $C_3$–$C_{12}$ ketones that can be used in the stirred tank reactor process for producing polymers from triazine derivatives are acetone, methylethylketone, isopropylethylhexyl ketone or isobutylmethyl ketone.

The triazine derivatives A)/polyfunctional compounds B) or triazine derivatives A)+other functional compounds C)/polyfunctional compounds B) molar ratios for producing triazine prepolymers with number average molar weights in the range from 200 to 8000 and for producing the thermoplastic polymers with number average molar weights in the range from $8 \times 10^3$ to $10^7$ in the stirred tank reactor process are like those used in the melt process.

It is useful when producing thermoplastic polymers from triazine derivatives with number average molar weights in the range from $8 \times 10^3$ to $10^7$ to continue the reaction after the reaction in the stirred tank reactor with a second process step in a melt if a great molar weight is to be achieved.

The polymers made from triazine derivatives are preferably suited for producing uncured or cross-linked compression molded or injection molded products for uses in electrical engineering and electronics, for producing films and fibers, especially filter materials and non-flammable textiles, pipes, plates and hollow bodies, microcapsules containing solids or liquids for photosensitive and pressure-sensitive photographic and copying papers as well as for pharmaceutical and agricultural uses; foams for heat and sound insulation in buildings and vehicles, coatings, especially baking finishes in the vehicle and appliances industries and for scratchproof wood finishes, laminates for uses in construction and in the furniture industry, and impregnated flat-shaped carrier materials, especially impregnated flat-shaped carrier materials in the textile and paper industries.

Preferred flat-shaped carrier materials that may be included in the laminates with polymers from triazine derivatives are paper, cardboard, wood products, wood fiberboards, wood chipboards, textile fleeces, textile fabrics, plastic films, plastic sheets, flat-shaped plastic parts, metallic foils or flat-shaped metal parts such as car body parts in the car industry or panels in the appliances industry and in machine-building.

Intermediates and molded materials made of the polymers from triazine derivatives according to the invention are characterized by improved toughness, high flame resistance and strength as compared to intermediates and molded materials made from common triazine polymers such as melamine and guanamine resins; also, the products show improved resistance to cracking in thermal postforming without any considerable drop in strength.

The molded materials for producing pressed pieces, compression molded parts or profiles using the polymers from triazine derivatives of the invention in the form of prepolymers with number average molar weights in the range from 200 to 8000 can in particular be formulated by casting impregnation. In the casting impregnation process, powdered or granulated prepolymers from triazine derivatives are dryly intermixed with fillers such as wood meal or stone powder and the common additives such as hardeners, lubricants and pigments and homogenized on rolling mills or in continuous kneaders. Preferred processing temperatures are in the range from 140° C. to 190° C. for pressed parts and from 155° C. to 200° C. for injection molded parts. Pressed, injection molded parts or profiles made of the polymers of the invention from triazine derivatives are characterized by improved toughness, and high flame resistance and strength.

Suitable hardeners that can be used for producing pressed pieces, compression molded parts or profiles using the polymers from triazine derivatives of the invention in the form of prepolymers with number average molar weights in the range from 200 to 8000 are acidic catalysts such as ammonium peroxodisulfate, ammonium phosphate, ammonium sulfate, methylammonium phthalate or diethyl phosphate, polyisocyanates such as tetramethylene diisocyanate, hexamethylene diisocyanate, toluylene diisocyanate, diphenylmethane diisocyanate, phenylene diisocyanate, naphthylene diisocyanate, and triphenylmethane triisocyanate, polycarboxylic acid anhydrides such as succinic acid anhydride, maleic acid anhydride, phthalic acid anhydride, dodecencyl succinic anhydride, itaconic acid anhydride, and pyromellitic acid anhydride.

The injection molded sheets, fibers, pipes, plates, or hollow bodies made of the thermoplastic polymers from triazine derivatives of the invention and having number average molar weights in the range from $8 \times 10^3$ to $10^7$ can be produced on conventional thermoplastics processing machines at processing temperatures from 220 to 300° C. Polymers from triazine derivatives having number average molar weights in the range from $8 \times 10^3$ to $10^5$ are suitable for producing injection molded products and fibers, polymers from triazine derivatives having number average molar weights in the range from $5 \times 10^4$ to $10^7$ are suitable for producing sheets, pipes, plates or hollow bodies.

0.01 to 2.5 percent by weight of stabilizers and/or 0.01 to 5 percent by weight of processing auxiliaries (based on the weight of the respective polymers from triazine derivatives used) can be added for the thermoplastic processing of the thermoplastic polymers from triazine derivatives of the invention having number average molar weights in the range from $8 \times 10^3$ to $10^7$.

Preferred as stabilizers are mixtures of 0.01 to 0.6 percent by weight of phenolic antioxidants, 0.01 to 0.6 percent by weight of 3-arylbenzofuranones, 0.01 to 0.6 percent by weight of phosphite-based processing stabilizers, 0.01 to 0.6 percent by weight of high-temperature stabilizers based on disulfides and thioethers and/or 0.01 to 0.8 percent by weight of sterically hindered amines (HALS).

Processing auxiliaries that can be added when processing thermoplastic polymers from triazine derivatives of the invention are calcium stearate, magnesium stearate and/or waxes.

The injection molded products, sheets, fibers, pipes, plates and hollow bodies made of the thermoplastic polymers from triazine derivatives according to the invention are characterized by improved toughness, high flame resistance and strength as compared to products made from common triazine polymers such as melamine and guanamine resins.

Microcapsules are produced by inserting the polymers from triazine derivatives of the invention present in the form of prepolymers with number average molar weights in the range from 200 to 8000 into an emulsifier-free hydrous dispersion of solid or liquid capsule core formers that contains acidic catalysts, subsequent hardening and spray drying. The use of capsule core formers when producing microcapsules is determined by the field of application of these capsules. Solid capsule core formers include finely disperse photochemicals, herbicides, pesticides, agrochemicals, pharmaceuticals, pigments, dyes, flame retardants, catalysts, magnetic particles, and stabilizers. Liquid capsule core formers include adhesives, flavoring agents, perfumes, inks, and liquids that can be dispersed in water such as oils.

Fibers of polymers from triazine derivatives are produced starting from prepolymers with a number average molar weight in the range from 200 to 8000. Fibers are produced from highly concentrated solutions of these prepolymers (solids content 35 to 85 percent by weight) by centrifugal pot spinning, fiber elongating, extruding or fibrillating processes with optional subsequent stretching and hardening. In the extrusion process, the spinning solution is pressed through a nozzle into an atmosphere heated up to 170 to 320° C. (air or inert gas) to remove the solvents contained in the spinning solution and harden the fibers in as short a time as possible. Threads may also be produced from prepolymers of triazine derivatives using the melt spinning process. The fibers made of the polymers from triazine derivatives according to the invention show improved elasticity, i.e. better stretching properties and high strength, as compared to the common triazine polymers such as melamine or guanamine resins.

Closed-cell foam materials or closed-cell profiles made of polymers from triazine derivatives are produced starting from prepolymers with a number average molar weight in the range from 200 to 8000 by inserting these prepolymers into an emulsifier-free hydrous dispersion of volatile hydrocarbons and/or inert gases that contains acidic catalysts, removal and subsequent hardening.

Open-cell foam materials of polymers from triazine derivatives are produced starting from prepolymers with a number average molar weight in the range from 200 to 8000 by inserting these prepolymers into an hydrous emulsion of expanding agents consisting of volatile hydrocarbons, inert gases, and/or inorganic carbonates and containing acidic catalysts, heating up to the boiling or decomposition temperature of the expanding agent and transferal either to molds and hardening to open-cell foam materials or to a molding tool and hardening to open-cell foamed profiles. The closed-cell or open-cell foams of the polymers from triazine derivatives according to the invention show improved toughness as compared to the common foams made of triazine polymers such as melamine or guanamine resins.

Varnish resin coatings made of polymers from triazine derivatives of the invention are produced by formulating mixtures of prepolymers having a number average molar weight in the range from 200 to 8000 with added pigments, hardeners and optional fillers, stabilizers, solvents, and film producers such as alkyd resins, epoxy resins and/or phenol resins, applying this mixture to carrier materials such as wood, and hardening at temperatures below 80° C., or applying to metallic carrier substances and hardening at temperatures up to 180° C.

Laminates or multi-layer laminated boards made of polymers from triazine derivatives of the invention are produced by impregnating flat-shaped carrier materials of organic or inorganic fibers in the form of sheets, webs, mats or fleeces with a hydrous solution or dispersion of prepolymers having a number average molar weight in the range from 200 to 8000 in an impregnating plant, for example, optionally by adding laminated silicates, then drying the product in drying tunnels at temperatures up to 130° C., hardened as laminate or pressed on multi-tier presses into laminated boards after cutting and optionally inserting intermediate layers such as wood, paper, or cardboard. The improved toughness of laminates or multi-layer laminated boards is important for thermal postprocessing during which the material should not crack at low bending radii.

The invention is explained in greater detail by the examples below.

EXAMPLE 1

1.1 Producing the Triazine Derivative Mixture

After purging with inert gas, 12 l of dimethyl sulfoxide dried using a molecular sieve are filled into a 20 l pressurized autoclave equipped with a stirrer, vertical condenser, and bottom discharge valve. 1.28 kg of melamine is added and partially dissolved under intense stirring. 300 ml of the catalyst solution containing n-butyl lithium in cyclohexane (1.8 mol/l) are added by dropping to this suspension at room temperature. A reaction time of 20 minutes is sufficient for the formation of the lithium-melamine adduct. Subsequently, 1.74 kg of propylene oxide is put into the pressurized autoclave, and the pressurized autoclave is heated under stirring to a temperature of 85° C. while the internal pressure in the autoclave settles at 1.2 bar. The melamine is completely dissolved after 20 minutes, and after 10 hours at 85° C. a homogeneous, weakly cream-colored solution forms that is reduced to 8 l by distilling off most of the cyclohexane and dimethyl sulfoxide in a 12 mm Hg vacuum, and spray dried.

The yield of triazine derivative mixture is 92% of the quantity of propylene oxide used. An IR analysis reveals that 35 mole percent of the hydroxypropyl groups bonded to the triazine ring are hydroxypropyl amino groups, 65 mole percent are bis(hydroxypropyl) amino groups.

1.2 Producing the Polymer from Triazine Derivatives

A suspension of 2.0 kg of diphenylmethane diisocyanate in 4.5 kg of 4-methylpentanone-2 is filled into a 20 l stirred tank reactor equipped with a stirrer, vertical condenser, and bottom discharge valve while being flushed with inert gas, and within 3 hours a solution of 3.0 kg of the triazine derivative mixture acc. to 1.1 is added under intense stirring.

After a reaction time of 4 hours at 115° C., the resulting polyurethane prepolymer with triazine sequences has a number average molar weight (GPC) of 2850.

1.3 Processing the Polyurethane Prepolymer Solution into Fibers

The solution of the polyurethane prepolymers in the 4-methylpentanone/dimethyl sulfoxide solvent mixture acc. to 1.2 (solids content 40 percent by weight), after adding 2 percent by weight (based on the weight of the polyurethane prepolymer) of trimellitic acid anhydride, as a hardener, is spun on a laboratory spinning frame from a storage tank heated to 115° C. by pumping it using a viscose pump through a size 10 nozzle (hole diameter 0.1 mm) into a dry spinning cell into which air is blown at a speed of 0.03 m/s and a temperature of 120 to 125° C. at a throughput of 2.0 g/min and a rate of extrusion of 75 m/min into filaments with a spun filament diameter of 37 $\mu$m, wound up on bobbins and condensated out and cross-linked during a 1.5-hour hot air treatment at 235° C.

The filaments produced in this way have a dry tensile strength of 1.6 cN/dtex and a breaking elongation of 34%.

EXAMPLE 2

2.1 Producing the Triazine Derivative Mixture

After purging with inert gas, 13 l of dimethyl sulfoxide dried using a molecular sieve are filled into a 20 l pressurized autoclave equipped with a stirrer, vertical condenser, and bottom discharge valve. A mixture of 756 g of melamine, 250 g of acetoguanamine and 29 g of dimethylol melamine dibutyl ether is added under intense stirring and partially dissolved. 330 ml of the catalyst solution containing isopropyl lithium in cyclohexane (1.5 mol/l) are added by dropping to this suspension at room temperature. A reaction time of 20 minutes is sufficient for the formation of the lithium adduct. Subsequently, 1.16 kg of propylene oxide is put into the pressurized autoclave, and the pressurized autoclave is heated under stirring to a temperature of 85° C. while the internal pressure in the autoclave settles at 1.2 bar. The mixture of melamine, acetoguanamine, and dimethylol melamine dibutyl ether is completely dissolved after 15 minutes, and after 12 hours at 85° C. a homogeneous, weakly cream-colored solution forms that is reduced to 5 l by distilling off most of the dimethyl sulfoxide and cyclohexane in a 12 mm Hg vacuum, and spray dried.

The yield of triazine derivative mixture is 96% of the quantity of propylene oxide used. An IR analysis reveals that 41 mole percent of the hydroxypropyl groups bonded to the triazine ring are hydroxypropyl amino groups, 59 mole percent are bis(hydroxypropyl) amino groups.

2.2 Producing the Polymer from Triazine Derivatives

The mixture of triazine derivatives acc. to 2.1 is filled at 2.34 kg/h into a Werner&Pfleiderer ZSK 30 twin-screw extruder with vacuum degassing and static mixer, L/D ratio=42, temperature profile 100/140/185/240/260/260/260/260/240/210° C. Tetramethylene diisocyanate is added at 1.4 kg/h to zone 3 of the extruder, and the reaction mixture is output after vacuum degassing (dwell time in the extruder and the static mixer: 12 minutes).

The resulting polyurethane with chain sequences of triazine derivatives has a melting range of 220 to 228° C. and a number average molar weight (GPC) of 8.8×10$^4$.

2.3 Injection Molding of the Polymer from Triazine Derivatives

Standard test bars were produced using a Ferromatic Millacron FM 60 injection molding machine (3-zone screw, screw length 22 D) at a batch temperature of 285° C. and a tool temperature of 90° C.

Property testing (23° C.) revealed the following results:

Tensile strength (DIN 53 457/ISO 527): 75 MPa

Elongation (DIN 53 457/ISO 527): 8.8%

Modulus of elasticity in tension (DIN 53 457/ISO 527): 2890 MPa

Izod notched impact strength (ISO 180-1A): 4.8 kJ/m$^2$

Flame resistance acc. T o UL 94 (1.6 mm): Class V-0

EXAMPLE 3

3.1 Producing the Triazine Derivative Mixture

After purging with inert gas, 12 l of dimethyl formamide dried using a molecular sieve are filled into a 20 l pressurized autoclave equipped with a stirrer, vertical condenser, and bottom discharge valve. A mixture of 1.0 kg of melamine and 490 g of methoxymethyl benzoguanamine is added under intense stirring and partially dissolved. 500 ml of the catalyst solution containing boron triethyl in n-heptane (1.9 mol/l) are added by dropping to this suspension at room temperature. A reaction time of 40 minutes is sufficient for the formation of the boron adduct. Subsequently, 1.76 kg of ethylene oxide is put into the pressurized autoclave, and the pressurized autoclave is heated under stirring to a temperature of 80° C. while the internal pressure in the autoclave settles at 8 bar. The mixture of melamine and methoxymethyl benzoguanamine is completely dissolved after 30 minutes, and after 15 hours at 80° C. a homogeneous, weakly cream-colored solution forms that is reduced to 6 l by distilling off most of the heptane and the dimethyl formamide in an 8 mm Hg vacuum, and spray dried.

The yield of triazine derivative mixture is 88% of the quantity of ethylene oxide used. An IR analysis reveals that 28 mole percent of the hydroxyethyl groups bonded to the triazine ring are hydroxyethyl amino groups, 59 mole percent are bis(hydroxyethyl) amino groups.

3.2 Producing the Polymer from Triazine Derivatives

A 10 l stirred tank reactor with inert gas input, vertical condenser and bottom outlet is charged with a mixture of 3.23 kg of the triazine derivative mixture according to 3.1, 2.07 kg of dimethyl sebazate, and 0.45 kg of polypropylene oxide (molar weight 450) and heated for 4.5 hours to 175° C. under stirring and inert gas flushing. Subsequently the internal pressure is continuously reduced to 0.05 torr, and the melt is stirred for 6 hours at 215° C./0.05 torr. The melt of the oligomeric polyester is put on a cooling conveyer and broken.

The resulting oligomeric polyester with triazine sequences has a number average molar weight (GPC) of 3800.

3.3 Formulation of the Oligomeric Polyester with Triazine Sequences to a Molded Material and Processing into a Hardboard A mixture of 3.4 kg of bleached sulfite cellulose, 1.1 kg of chalk, 100 g of magnesium stearate, 50 g of ammonium peroxodisulfate and 150 g of maleic acid is impregnated with 10 l of a 35% aqueous solution of the oligomeric polyester acc. to 3.2 in a heatable kneader, homogenized, dried at 80° C. removed and granulated. The molded mass particles are processed in a heatable press at a tool temperature of 175° C. und a molding pressure of 250 bar into 100×100 mm plates, 4 mm thick.

Milled test bars have the following properties:

Tensile strength: 26 MPa

Bending strength 72 MPa

Modulus of elasticity in tension: 6800 MPa
Impact strength: 17.0 kJ/m²
Notched impact strength: 5.8 kJ/m²

EXAMPLE 4

4.1 Producing the Triazine Derivative Mixture

After purging with inert gas, 12 l of dimethyl sulfoxide dried using a molecular sieve are filled into a 20 l pressurized autoclave equipped with a stirrer, vertical condenser, and bottom discharge valve. 1.26 kg of melamine is added and partially dissolved under intense stirring. 300 ml of the catalyst solution containing n-butyl lithium in cyclohexane (1.6 mol/l) are added by dropping to this suspension at room temperature. A reaction time of 20 minutes is sufficient for the formation of the lithium-melamine adduct. Subsequently, 3.48 kg of propylene oxide is put into the pressurized autoclave, and the pressurized autoclave is heated under stirring to a temperature of 85° C. while the internal pressure in the autoclave settles at 1.2 bar. The melamine is completely dissolved after 20 minutes, and after 10 hours at 85° C. a homogeneous, weakly cream-colored solution forms that is reduced to 6.5 l by distilling off most of the cyclohexane and dimethyl sulfoxide in a 12 mm Hg vacuum, and spray dried.

The yield of triazine derivative mixture is 88% of the quantity of propylene oxide used. An IR analysis reveals that 23 mole percent of the hydroxypropyl groups bonded to the triazine ring are hydroxypropyl amino groups, 77 mole percent are bis(hydroxypropyl) amino groups.

4.2 Producing the Polymer from Triazine Derivatives

The mixture of triazine derivatives acc. to 4.1 is filled at 4.74 kg/h into a Werner&Pfleiderer ZSK 30 twin-screw extruder with vacuum degassing and static mixer, L/D ratio=42, temperature profile 50/90/130/170/210/210/210/210/160/110° C. Ethyleneglycol diglycidyl ether (d=1.12, $Kp_2$=119° C.) is added at 1.38 kg/h to zone 3 of the extruder, and the reaction mixture is output after vacuum degassing (dwell ture is output after vacuum degassing (dwell time in the extruder and the static mixer: 12 minutes).

The resulting oligomeric polyhydroxyester with chain sequences of triazine derivatives has a number average molar weight (GPC) of 5600.

4.3 Producing a Laminate

A decorative paper (basis weight 80 g/m²) and a kraft paper core (basis weight 180 g/m²) are impregnated at 45° C. with a 40% aqueous solution of the oligomeric polyhydroxy ether acc. to 4.3, containing 1.5 percent by weight (i.e. polyhydroxy ether weight) of pyromellitic acid as a hardener.

After drying at 140° C. in a forced air oven to a moisture content of 5.8%, the decorative paper has a resin portion of 56 percent by weight and the kraft paper has a resin portion of 44 percent by weight. Subsequently, one layer of the impregnated decorative paper is compressed with three layers of core paper in a Collin laboratory press for 120 seconds at a pressure of 90 bar at 165° C.

The postforming properties of the resulting laminate were tested for elasticity. No cracks occurred in the laminate when the laminate was bent around a 3 mm metal dome heated up to 160° C.

We claim:

1. Polymers made from triazine derivatives for intermediates and molded materials with improved toughness, high flame resistance and strength, wherein said polymers from triazine derivatives are polymers prepared from:

A) 60 to 95 percent by weight of triazine derivative mixtures comprising:

A1) 20 to 70 percent by weight of triazine derivatives with hydroxyalkyl amino groups of the formula

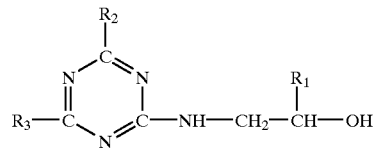

wherein
   $R_1$=H or $C_1$–$C_4$ alkyl,
   $R_2$=—H; —OH; $C_1$–$C_4$ alkyl, —$C_6H_5$; —$NH_2$; —NH—$CH_2$—$CHR_1$—OH; —NH—$CH_2$—$OR_1$, or —N(—$CH_2$—$OR_1$)$_2$,
   $R_3$=—H; —OH; $C_1$–$C_4$ alkyl, —$C_6H_5$; —$NH_2$; —NH—$CH_2$—$CHR_1$—OH; —NH—$CH_2$—$OR_1$, or —N(—$CH_2$—$OR_1$)$_2$, and the number of hydroxyalkyl amino groups is 1 to 3; and A2) 80 to 30 percent by weight of triazine derivatives with bis(hydroxyalkyl)amino groups of the formula

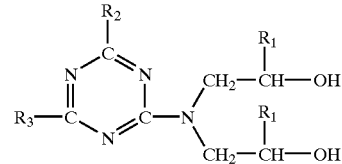

wherein
   $R_1$=H or $C_1$–$C_4$ alkyl,
   $R_2$=—H; —OH; $C_1$–$C_4$ alkyl, —$C_6H_5$; —$NH_2$; —NH—$CH_2$—$CHR_1$—OH, —N[$CH_2$—$CHR_1$—OH]$_2$, —NH—$CH_2$—$OR_1$, or —N(—$CH_2$—$OR_1$)$_2$,
   $R_3$=—H; —OH; $C_1$–$C_4$ alkyl, —$C_6H_5$; —$NH_2$; —NH—$CH_2$—$CHR_1$—OH, —N[$CH_2$—$CHR_1$—OH]$_2$, —NH—$CH_2$—$OR_1$, or —N(—$CH_2$—$OR_1$)$_2$,
   and the number of hydroxyalkyl groups is 2 to 6;

B) 5 to 40 percent by weight of polyfunctional compounds comprising one or more selected from the group consisting of:

B1) one or more selected from the group consisting of polyisocyanates of the formula R (N=C=O)$_x$, where R is one or more selected from the group consisting of $C_4$–$C_{18}$ alkyl, $C_5$–$C_8$ cycloalkyl, and $C_6$–$C_{15}$ aryl, where x=2, 3, or 4; and one or more selected from the group consisting of oligomeric polyesters and polyethers with isocyanate end groups having a molecular weight in the range from 200 to 5000;

B2) one or more selected from the group consisting of aliphatic $C_2$–$C_{36}$ dicarboxylic acids, aliphatic $C_2$–$C_{36}$ dicarboxylic esters, aliphatic $C_2$–$C_{36}$ dicarboxylic acid chlorides, aliphatic $C_4$–$C_6$ dicarboxylic acid anhydrides, aromatic polybasic $C_8$–$C_{23}$ carboxylic acids, aromatic polybasic $C_8$–$C_{23}$ carboxylic esters, aromatic polybasic $C_8$–$C_{23}$ carboxylic acid chlorides and aromatic polybasic $C_8$–$C_{23}$ carboxylic acid anhydrides; and B3) one or more selected from the group consisting of aliphatic $C_8$–$C_{25}$ or aromatic $C_{12}$–$C_{28}$ diglycidyl, or triglycidyl compounds; and, optionally, C) 1 to 20 percent by weight of one or more other functional compounds selected from the group consisting of $C_2$–$C_{18}$ aliphatic, $C_5$–$C_8$ cycloaliphatic or $C_6$–$C_{15}$ aromatic dihydroxy compounds, polyalkylene glycols with a molar weight in the range from 200 to 8000, and $C_1$–$C_8$ aliphatic aldehydes.

2. The polymers from triazine derivatives according to claim 1, wherein the polymers are prepolymers with number average molecular weights in the range from 200 to 8000.

3. The polymers from triazine derivatives according to claim 1, wherein the polymers are cross-linked thermosetting polymers.

4. The polymers from triazine derivatives according to claim 1, wherein the polymers are thermoplastic polymers with number average molecular weights in the range from $8 \times 10^3$ to $10^7$.

5. The polymers from triazine derivatives according to claim 1, wherein the triazine derivative mixtures A) comprise:

A1) triazine replaced by hydroxyalkyl amino groups at a triazine/hydroxyalkyl amino group molar ratio from 1:1 to 1:2.5, and A2) triazine replaced by bis(hydroxyalkyl) amino groups and hydroxyalkyl amino groups at a triazine/hydroxyallcyl group molar ratio from 1:2.5 to 1:5.5.

6. The polymers from triazine derivatives according to claim 1, wherein the polyisocyanates B1) as polyfunctional compounds B) are selected from the group consisting of tetramethylene diisocyanate, hexamethylene diisocyanate, toluylene diisocyanate, diphenylmethane diisocyanate and mixtures thereof.

7. The polymers from triazine derivatives according to claim 1, wherein the dicarboxylic acid anhydrides B2) as polyfunctional compounds B) are selected from the group consisting of succinic acid anhydride, maleic acid anhydride, glutaric acid anhydride, phthalic acid anhydride, norbornene dicarboxylic acid anhydride and mixtures thereof.

* * * * *

UNITED STATES PATENT AND TRADEMARK OFFICE
CERTIFICATE OF CORRECTION

PATENT NO. : 6,818,726 B2
DATED : November 16, 2004
INVENTOR(S) : Rätzsch et al.

It is certified that error appears in the above-identified patent and that said Letters Patent is hereby corrected as shown below:

Column 5,
Line 6, "oligomenc polyesters" should read -- oligomeric polyesters --

Column 16,
Lines 2-3, "triazine/hydroxyallcyl" should read -- triazine/hydroxyalkyl --

Signed and Sealed this

Fifth Day of July, 2005

JON W. DUDAS
*Director of the United States Patent and Trademark Office*